(12) United States Patent
Hirano

(10) Patent No.: US 8,687,233 B2
(45) Date of Patent: Apr. 1, 2014

(54) PRINT PREVIEW APPARATUS AND RECORDING MEDIUM RECORDING A PROGRAM

(75) Inventor: Sachiko Hirano, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 373 days.

(21) Appl. No.: 13/156,303

(22) Filed: Jun. 8, 2011

(65) Prior Publication Data

US 2011/0310411 A1   Dec. 22, 2011

(30) Foreign Application Priority Data

Jun. 18, 2010   (JP) ................................. 2010-139082

(51) Int. Cl.
*H04N 1/60* (2006.01)
*H04N 1/46* (2006.01)
*G03F 3/08* (2006.01)

(52) U.S. Cl.
USPC ............................. 358/1.9; 358/504; 358/518

(58) Field of Classification Search
USPC ............ 358/1.9, 504, 518; 345/619; 356/402; 715/274
See application file for complete search history.

(56) References Cited

U.S. PATENT DOCUMENTS

| | | | |
|---|---|---|---|
| 7,525,685 B2 * | 4/2009 | Maniam et al. | 358/1.9 |
| 7,961,321 B2 * | 6/2011 | Bonikowski et al. | 356/402 |
| 2004/0095360 A1 * | 5/2004 | Tseng et al. | 345/619 |
| 2008/0204772 A1 * | 8/2008 | Kauffman | 358/1.9 |
| 2009/0290180 A1 * | 11/2009 | Onoda | 358/1.9 |

FOREIGN PATENT DOCUMENTS

| | | |
|---|---|---|
| JP | 07-087521 | 3/1995 |
| JP | 09-326940 | 12/1997 |
| JP | 2004-200938 | 7/2004 |
| JP | 2007-174125 | 7/2007 |
| JP | 2008-160388 | 7/2008 |
| WO | WO 2008/033694 | 3/2008 |

OTHER PUBLICATIONS

Notification of Refusal for appl. No. JP 2010-139082, dispatched Aug. 20, 2013, 2 pgs.
Translation of the Notification of Refusal for appl. No. JP 2010-139082, dispatched Aug. 20, 2013, 4 pgs.

* cited by examiner

*Primary Examiner* — Charlotte M Baker
(74) *Attorney, Agent, or Firm* — Squire Sanders (US) LLP

(57) ABSTRACT

Disclosed is a print preview apparatus including: an output control section which outputs an adjustment chart with a plurality of print color sample images formed based on a color data value of a color space depending on a print device adjusted to a color gamut reproducible by the print apparatus; a conversion section which converts each color data value of the color space depending on the print device to a color data value of a color space depending on a display device; a display section which displays a plurality of display color sample images corresponding to each of the plurality of print color sample images; and an adjustment section which presents the plurality of display color sample images displayed on the display section and which adjusts a color data value indicating a color of the presented display color sample image based on color adjustment information.

12 Claims, 12 Drawing Sheets

PRINT PREVIEW APPARATUS AND RECORDING MEDIUM RECORDING A PROGRAM

BACKGROUND

1. Field of the Invention

The present invention relates to a print preview apparatus and a recording medium recording a program.

2. Description of Related Art

Lately, there is a technique which displays (previews) an image on a display apparatus such as a monitor, etc. in order to confirm in advance the image formed on a sheet based on image data by a print apparatus such as a printer, copier, etc. However, in a print apparatus, color is generated by toner colors such as cyan (C), magenta (M), yellow (Y) and black (K), whereas in a display apparatus, color is generated by three primary colors of light which are red (R), green (G) and blue (B). Therefore, the color gamut of each apparatus is different and a difference in color reproducibility occurs, resulting in a different impression.

Therefore, a technique is disclosed where image processing such as correction of color space range between the display apparatus and the print apparatus, correction of gamma error and color masking, etc., and correction in an absolute luminance level are performed on the image data which is previewed (see patent document 1: Japanese Patent Application Laid-Open Publication No. 7-87521).

Moreover, a technique is disclosed where printed test material corresponding to a displayed preview image is output and when a user performs adjustment to match color between the preview image and the printed test material, change of the color of the preview image based on the adjustment value and adjustment of color circle and brightness by performing calibration based on the adjustment value are performed. Moreover, the technique discloses when the user performs adjustment to match the color of the preview image with the printed test material, the print data is generated reflecting the adjustment value and the calibration and the printed material is output (see patent document 2: Japanese Patent Application Laid-Open Publication No. 2008-160388).

Patent document 1 adjusts the entire color gamut by performing a previously set correction processing of color reproducibility and the user cannot perform adjustment on a desired color. Patent document 2 is a technique which matches the color of the image displayed as a preview display on the display apparatus to the color of the image formed by the print apparatus and changes the entire hue, brightness and contrast. Therefore, partial adjustment (for example, to change color reproducibility of only a certain color phase, to change color reproducibility of a plurality of colors in different directions, etc.) is not possible. Moreover, patent document 1 and patent document 2 cannot perform adjustment regarding a portion where the color gamut of the print apparatus is larger than the color gamut of the display apparatus.

Moreover, in order to display a preview display to confirm the color of the formed image before the image is actually formed on the paper, the preview display needs to be performed by converting the final image data on which various image processing is performed according to the actual print setting to display data instead of directly converting the image data input in the print apparatus to display data of the display apparatus.

However, the accuracy of the color reproducibility of the image displayed as a preview display on the display apparatus is not always reliable. This is because it is troublesome and difficult to perform calibration and to generate and apply the profile in the display apparatus and measuring devices and software specific to the purpose are necessary, resulting in an increase in cost. Therefore, the processing is not performed appropriately. Moreover, even if there is a color conversion profile unique to the display apparatus, the user changes the setting of the luminance, etc. and the display apparatus deteriorates, resulting in change of the produced color. Further, difference of how the image looks according to the environment in which the image is seen or difference in the impression of the color tone according to each individual user makes it look as though the same color is not reproduced on the image of the preview display and the image formed on the paper.

However, in addition to enhanced function due to increase in variety of color conversion techniques and higher demand for color reproducibility, from the viewpoint of saving resources and economic reasons, the importance of confirming the color of the image by preview display before actually forming the image on the paper is rising.

Therefore, there is a demand to enable adjustment of the color of the image displayed by the preview display to the color of the image formed on the paper according to the user's intention with an easy operating process and low cost.

SUMMARY

The present invention has been made in consideration of the above problems, and it is one of main objects to enable adjustment of a color of an image displayed by the preview display according to the user's intention.

In order to achieve at least one of the above-described objects, according to an aspect of the present invention, there is provided a print preview apparatus including:

an output control section which outputs to a print apparatus an adjustment chart with a plurality of print color sample images formed based on a color data value of a color space depending on a print device adjusted to a color gamut reproducible by the print apparatus;

a conversion section which converts each color data value of the color space depending on the print device indicating a color of the plurality of print color sample images to a color data value of a color space depending on a display device;

a display section which displays a plurality of display color sample images corresponding to each of the plurality of print color sample images based on the color data value of the color space depending on the display device converted by the conversion section; and an adjustment section which successively presents to a user the plurality of display color sample images displayed on the display section and which adjusts a color data value indicating a color of the presented display color sample image based on color adjustment information input by the user based on the color of the presented display color sample image and the color of the print color sample image corresponding to the presented display color sample image.

Preferably, in the print preview apparatus, when the color of the print color sample image corresponding to the presented display color sample image is a color outside the color gamut reproducible by the display section, regarding each of the display color sample image presented to the user, the adjustment section presents a plurality of types of compression methods to compress the display color sample image corresponding to the print color sample image within a color gamut reproducible by the display section to the user and the adjustment section adjusts the color data value indicating the color of the display color sample image by applying the compression method selected by the user.

Preferably, in the print preview apparatus, the compression method presented to the user is a compression method which uses a color within the color gamut reproducible by the display section and emphasizes tone of the print color sample image or is a compression method which emphasizes accuracy between the color of the print color sample image and the color of the color gamut reproducible by the display section.

Preferably, in the print preview apparatus, the color adjustment information includes adjustment information of at least any one of hue, brightness or saturation of the color of the display color sample image.

Preferably, in the print preview apparatus, the color adjustment information includes a color value of the color of the display color sample image and a color value of the color of the print color sample image corresponding to the display color sample image.

Preferably, in the print preview apparatus, the print color sample image includes a bar shaped image in which the tone continuously changes and a patch image which indicates a color of the plurality of tones of the bar shaped image.

BRIEF DESCRIPTION OF THE DRAWINGS

The present invention will become more fully understood from the detailed description given hereinbelow and the appended drawings, and thus are not intended to define the limits of the present invention, and wherein.

DETAILED DESCRIPTION OF PREFERRED EMBODIMENTS

Embodiment 1

Below, embodiment 1 of the present invention is described in detail with reference to the drawings.

First, the configuration is described.

Figure 1:
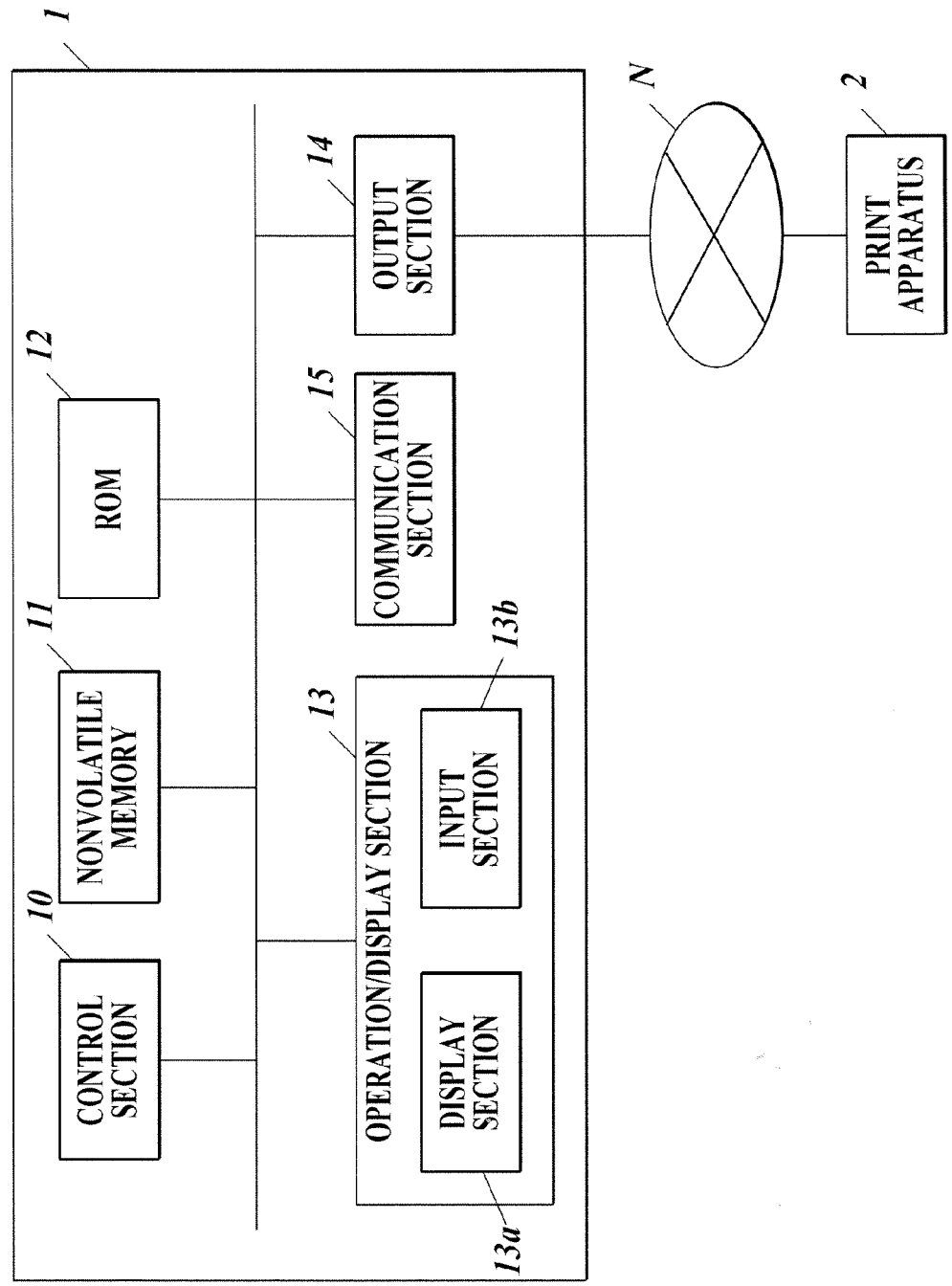
FIG. 1 is a functional configuration diagram of a print preview apparatus of embodiment 1.

FIG. 1 is a functional configuration diagram showing a print preview apparatus 1 of embodiment 1.

As shown in FIG. 1, print preview apparatus 1 includes a control section 10, a nonvolatile memory 11, a RAM (Random Access Memory) 12, an operation/display section 13, an output section 14, a communication section 15, and the like, and each section is connected electrically and controlled by the control section 10.

As the print preview apparatus 1 of embodiment 1, a typical PC (Personal Computer) including a printer controller function and connected to a print apparatus 2 through a communication network N can be used.

The print apparatus 2 is a printer using an electro-photographic method which forms an image with toner of cyan (C), magenta (M), yellow (Y) and black (K) based on print image data of a color data value (CMYK value) of a color space depending on a print device. The print apparatus 2 receives print image data from the print preview apparatus 1 or other such device, and forms an image on the paper based on the received print image data and outputs the paper.

The control section 10 is composed of a CPU (Central Processing Unit), etc. The control section 10 reads out a program specified from a system program and various application programs stored in the nonvolatile memory 11, expands the program in the RAM 12 and in coordination with the program expanded in RAM 12, various processing is performed. The control section 10 centrally controls each section of the print preview apparatus 1.

Further, the control section 10 reads out a display color adjustment processing program, a preview processing program and various pieces of data of embodiment 1 from the nonvolatile memory 11 and expands the program and the pieces of data in the RAM 12. Then, in coordination with the program and the pieces of data, the control section 10 performs the display color adjustment processing and the preview processing and functions as an adjustment section.

The preview processing is processing to display a preview display of an image based on job data and is performed so that the user can confirm the image before the image based on the job data is output by the print apparatus 2.

In the display color adjustment processing, first, the adjustment chart on which a plurality of print color sample images are formed is output from the print apparatus 2.

Moreover, each color data value (CMYK value) of the color space depending on the print device showing a color of the plurality of print color sample images are converted to a color data value (RGB value) of a color space depending on the display device. A preview screen is displayed on a display section 13a of an operation/display section 13 and the preview screen displays a plurality of display color sample images (preview image of adjustment chart) corresponding to each of the plurality of print color sample image based on the converted color data value (RGB value) of the color space depending on the display device.

Next, in the display color adjustment processing of embodiment 1, a color adjustment screen is displayed on the display section 13a and the color adjustment screen successively presents each of the plurality of display color sample images on the preview screen. Then, color adjustment information is obtained including adjustment information of hue, saturation and brightness input by a user based on the color of the presented display color sample image and the color of the print color sample image corresponding to the presented display color sample image. The color data value (RGB value)

showing the color of the presented display color sample image is adjusted based on the obtained color adjustment information.

Moreover, in the display color adjustment processing, when the color of the print color sample image corresponding to the presented display color sample image is a color outside the color gamut which can be reproduced by the display section 13a, a color gamut compression method adjustment screen is displayed on the display section 13a and the color gamut compression method adjustment screen presents various types of compression methods to compress the display color sample image corresponding to the print color sample image within a color gamut which can be reproduced by the display section 13a to the user. The compression method selected by the user on the color gamut compression method adjustment screen is applied to generate correction data to adjust the color data value showing the color of the display color sample image and the correction data is stored in the nonvolatile memory 11.

Figure 2:
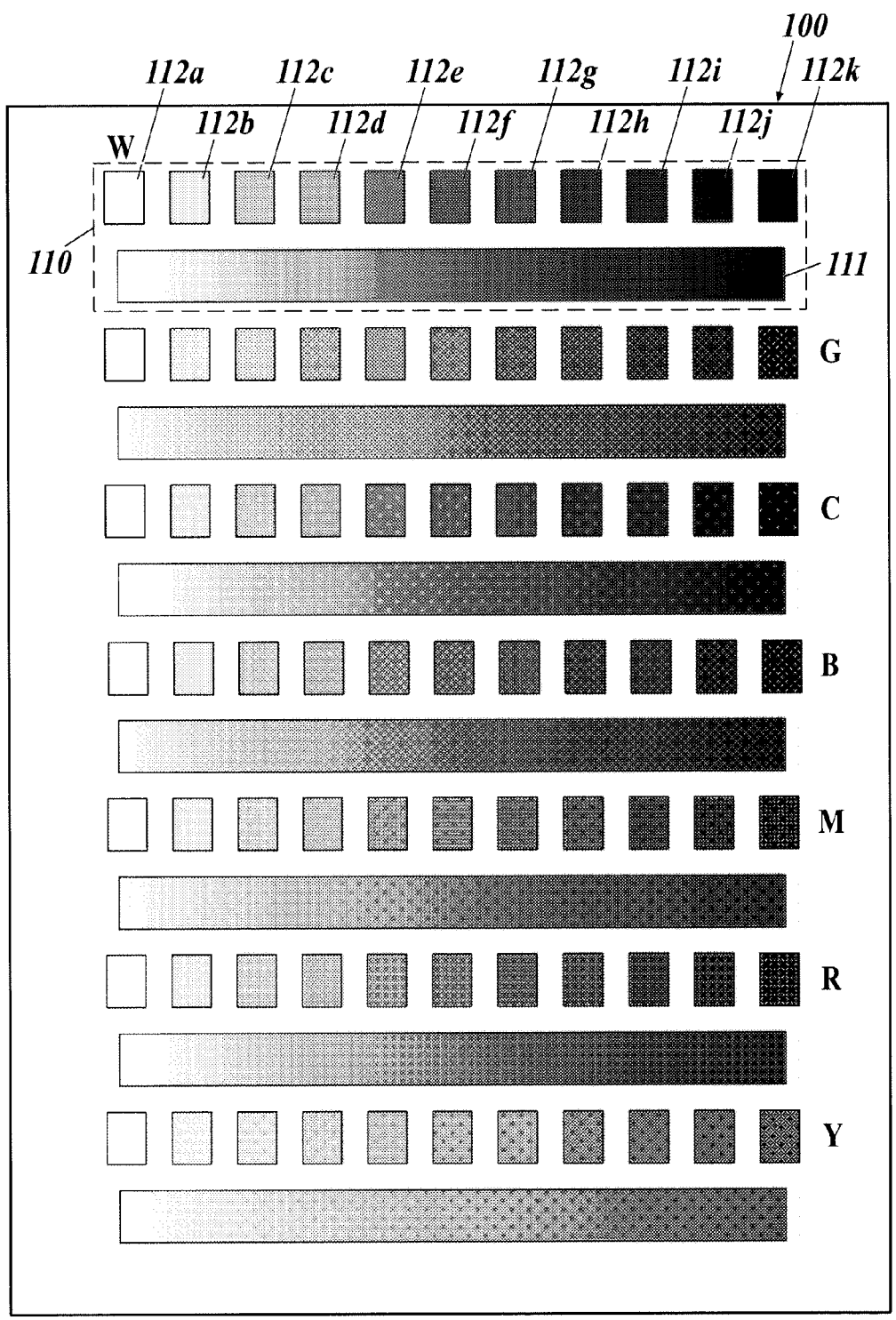
FIG. 2 is a diagram showing an example of an adjustment chart.

FIG. 2 shows an example of an adjustment chart.

As shown in FIG. 2, the adjustment chart 100 is formed with a print color sample image including a gradation image and a plurality of patch images for each color of primary colors consisting of black (K), cyan (C), magenta (M) and yellow (Y) and secondary colors of cyan (C), magenta (M) and yellow (Y) (green (G), blue (B), red (R)).

The gradation image is a bar shaped image in which the tone continuously changes. FIG. 2 is an image in which the tone changes from pure white (C=0%, M=0%, Y=0%, K=0%) to a solid color. For example, the gradation image 111 of black (K) shown in FIG. 2 is an image in which the tone changes from pure white (C=0%, M=0%, Y=0%, K=0%) to solid black (C=0%, M=0%, Y=0%, K=100%).

The patch image is a patch image which shows a color of a predetermined tone value among colors of a plurality of tone values represented by the gradation image. For example, the patch images 112a-112k of black (K) shown in FIG. 2 are patch images of colors in which the tone value is different by 10% and the patch image 112a is an image of a color of a tone value of 0%, the patch image 112b is an image of a color of a tone value of 10%, . . . , and the patch image 112k is an image of a color of a tone value of 100%.

Moreover, the patch image with a tone value of 100%, in other words, a patch image of a solid color (for example, patch image 112k) is also called a basic color patch. The color of the basic color patch of each color is positioned in the most outer perimeter of the color gamut reproducible by the display section 13a.

A gradation image from a solid black to a solid color of each color and a patch image of colors of a plurality of tone values of the gradation image can compose the print color sample image.

Moreover, as necessary, a gradation image from pure white or solid black to a certain color and the patch image of colors of a plurality of tone values of the gradation image can compose the print color sample image. In this case, it is preferable that the color used as the certain color is a color with high saturation (at least one of the tones of C, M, Y composing the certain color is 100%).

In addition to a system program, various application programs and various pieces of data, the nonvolatile memory 11 stores a display color adjustment processing program and preview processing program of embodiment 1, various pieces of data necessary to perform such programs, pieces of data processed by the various programs, and the like.

The RAM 12 forms a work area to temporarily store various programs performed by the control section 10, various pieces of data regarding these programs and the like. The RAM 12 also stores various pieces of information, etc. received on the operation/display section 13.

The operation/display section 13 includes a display section 13a including a display device such as an LCD (Liquid Crystal Display), EL (Electro-Luminescence) display, etc., and an input section 13b composed of a touch panel provided so as to cover the display section 13a and various operation key groups such as numeric keys, etc. The operation/display section 13 displays various screens, various processing results and the like on the display section 13a according to a display signal input from the control section 10. Moreover, the operation/display section 13 outputs an operation signal to the control section 10 an operation signal input from various switches, buttons, numeric keys, operation key groups or the touch panel composing the input section 13b.

The output section 14 performs management and control of data communication between the print apparatus 2 connected to the communication network N and other devices (not shown) and functions as a printer driver to output print image data to the print apparatus 2 according to an instruction from the control section 10.

The communication section 15 includes a driver of various external devices such as a USB driver, etc. and performs, control, etc. of data communication with the external device through a communication line such as a USB cable, etc.

Next, the operation of embodiment 1 is described.

Figure 3:
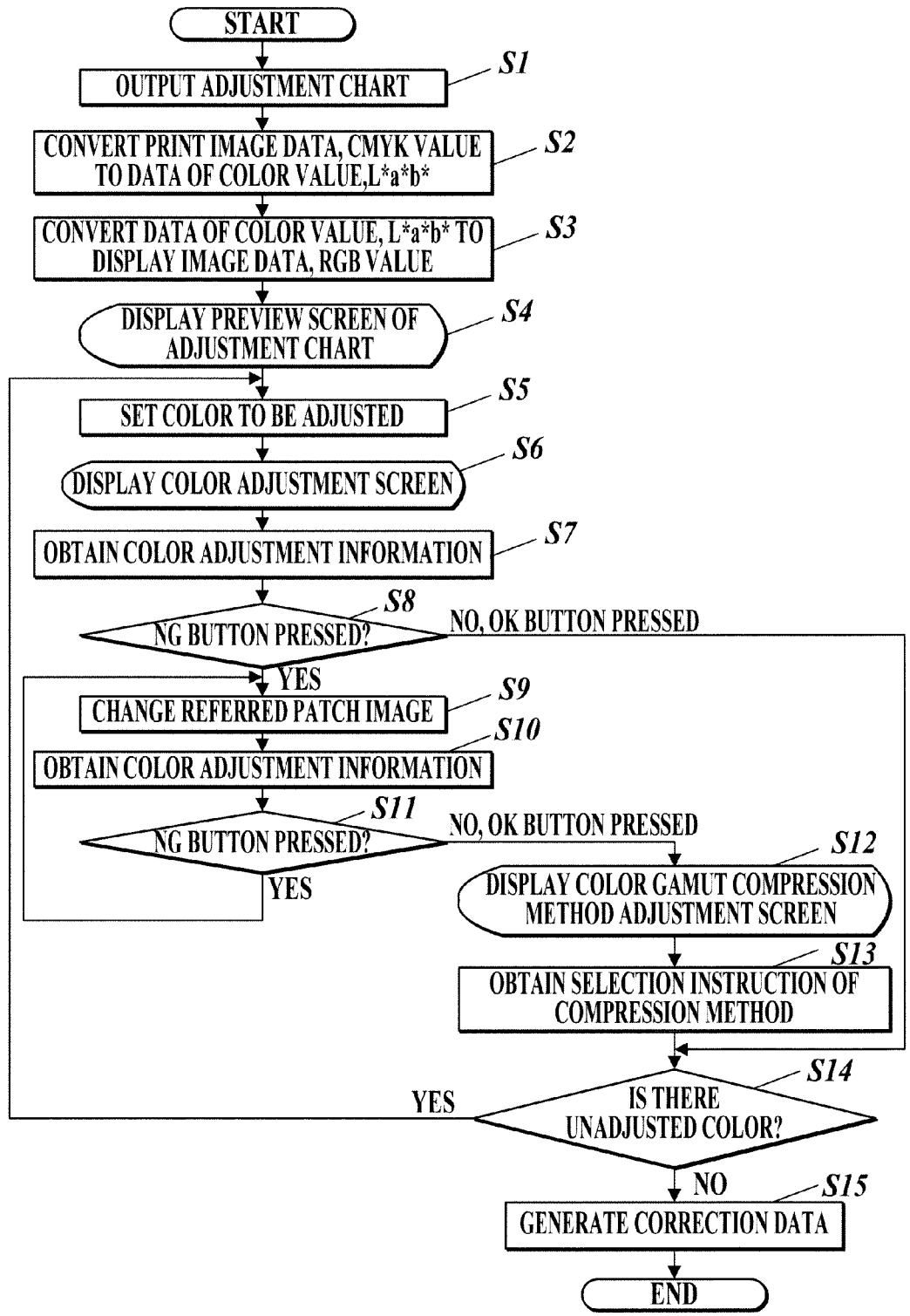
FIG. 3 is a flowchart of display color adjustment processing of embodiment 1.

FIG. 3 is a flowchart of display color adjustment processing of embodiment 1.

The control section 10 realizes the display color adjustment processing of embodiment 1 by performing the display color adjustment processing program.

First, the control section 10 allows the print apparatus 2 to output the adjustment chart (step S1).

In step S1, the control section 10 reads out the image data of the plurality of print color sample images stored in advance in the nonvolatile memory 11 and performs various image processing such as calibration on the image data. Then, the image data on which various image processing is performed is converted to print image data of color data value (CMYK value) of a color space depending on the print device based on the printer profile according to the ICC (International Color Consortium) profile and generates the data. Then, the control section 10 allows the output section 14 to output the print image data of the CMYK value converted to the color gamut reproducible by the print apparatus 2 to the print apparatus 2. The print apparatus 2 outputs the adjustment chart based on the input print image data.

Therefore, according to step S1, the control section 10 functions as an output control section which allows a print apparatus to output an adjustment chart.

The control section 10 converts the print image data of the CMYK value generated to output the adjustment chart in step S1 to data of color value (step S2).

There are numerous types of color systems to represent the color value such as L*a*b*, L*u*v*, etc. Each system defines in a different way, but basically the color value is positioned in a space composed of an axis representing brightness (L* etc.) and a plane representing saturation and hue (a*b*plane, etc.). In embodiment 1, the L*a*b* color system is used as the color system to represent the color value.

Further, the control section 10 converts the data of the color value (L*a*b*) generated in step S2 to display image data of color data value (RGB value) of a color space depending on a display device based on the monitor profile according to the ICC profile (step S3).

According to step S2 and S3, the control section 10 functions as a conversion section which converts each of the color data values of the color space depending on the print device showing the color of the plurality of print color sample images to color data values of the color space depending on the display device.

The control section 10 allows the display section 13a to display a preview screen of the adjustment chart based on the display image data of the RGB value converted to the color gamut reproducible by the display section 13a (step S4).

Figure 4:
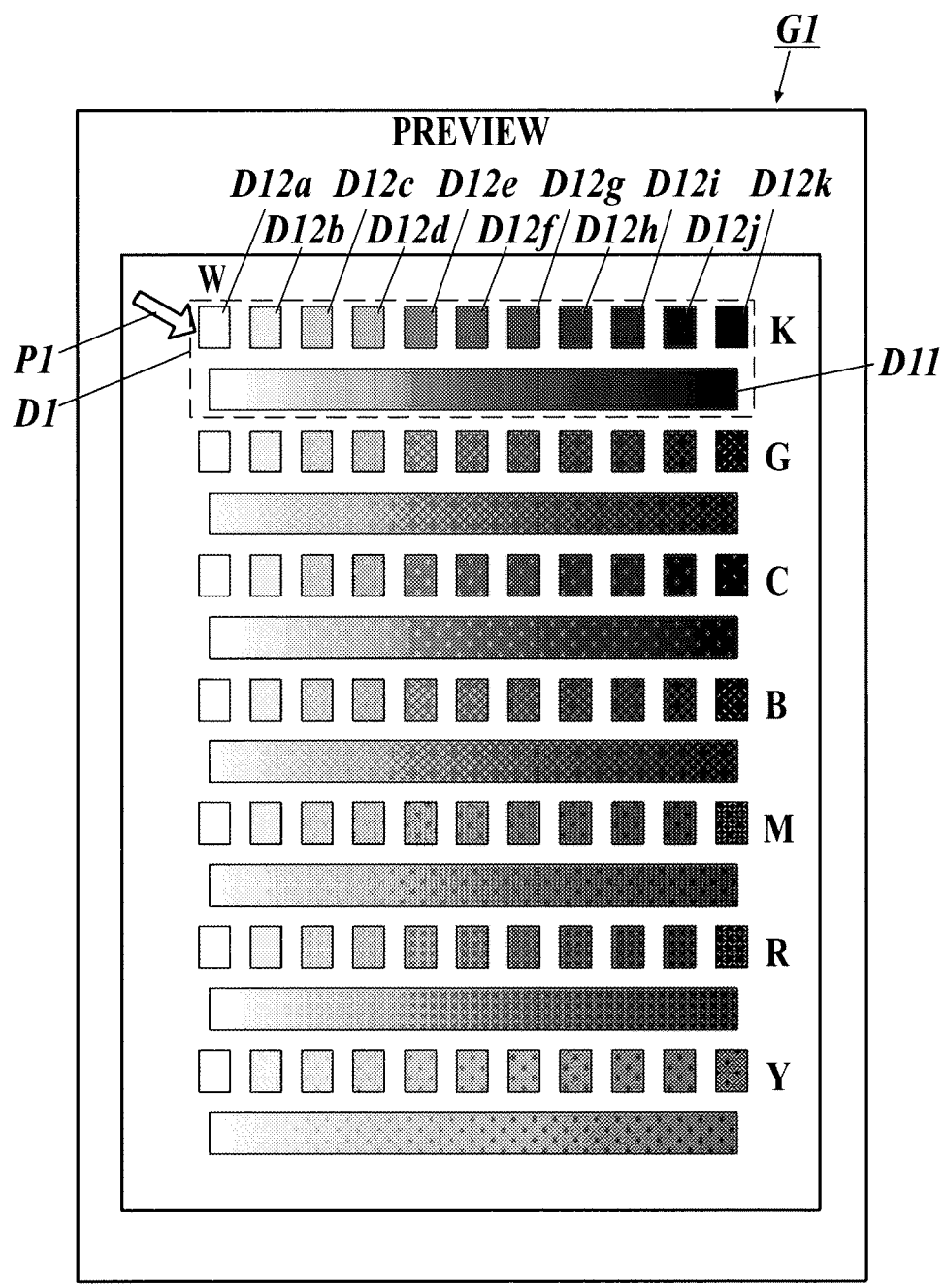
FIG. 4 is a diagram showing an example of a preview screen.

FIG. 4 shows an example of a preview screen displayed in step S4.

As shown in FIG. 4, a preview screen G1 displays a plurality of display color sample images D1 corresponding to the respective plurality of print color sample images 110 formed in the adjustment chart based on the display image data generated in step S3. Each of the display color sample image D1 includes a display gradation image D11 corresponding to the gradation image included in the corresponding print color sample image and display patch images D11a to D11k corresponding to the patch image.

Moreover, the preview image G1 is provided with a pointer P1 to show the display patch image of the display color sample image which the user compares by sight with the print color sample image on the adjustment chart when a later described color adjustment screen is displayed.

The control section 10 performs setting of color of the display color sample image to adjust the hue, brightness and saturation among the plurality of display color sample images (step S5) and allows the display section 13a to display the color adjustment screen which shows the display color sample image of the set color (step S6). Regarding the color to be set, for example, first pure white (C=0%, M=0%, Y=0%, K=0%), next solid black (C=0%, M=0%, Y=0%, K=100%), then each color of G, C, B, M, R and Y are successively set.

Figure 5:
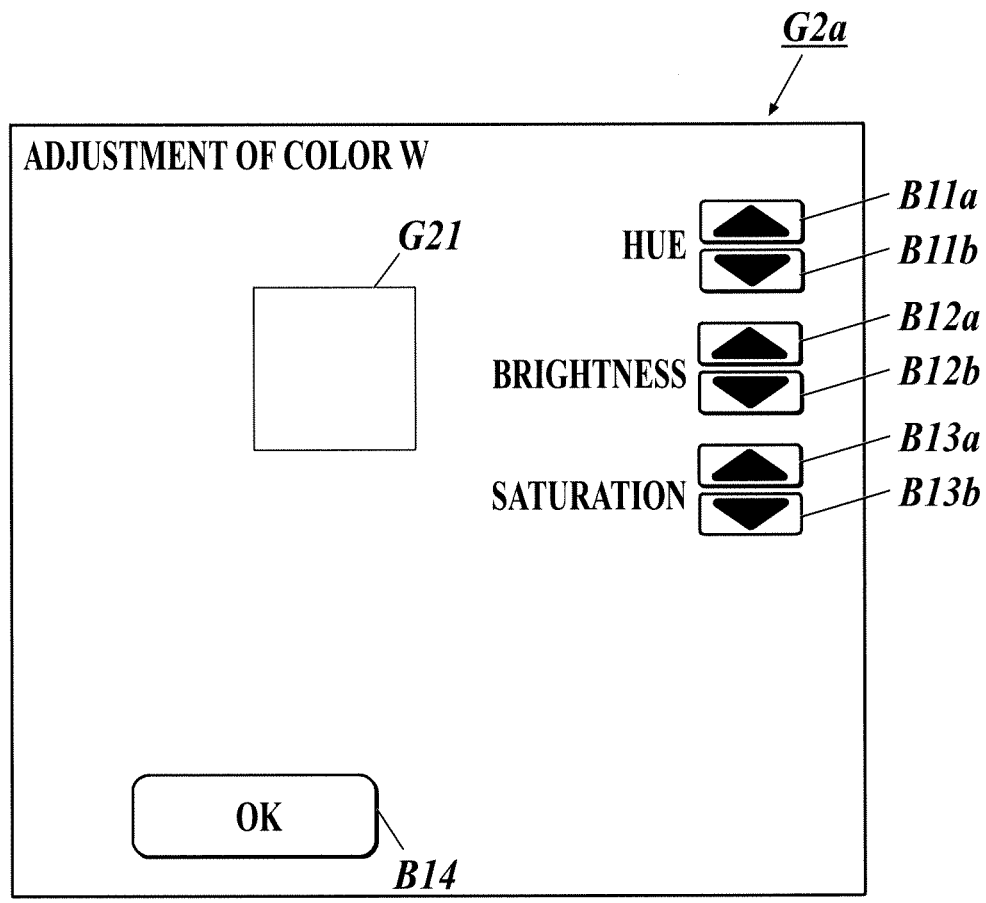
FIG. 5 is a diagram showing an example of a color adjustment screen.
Figure 6:
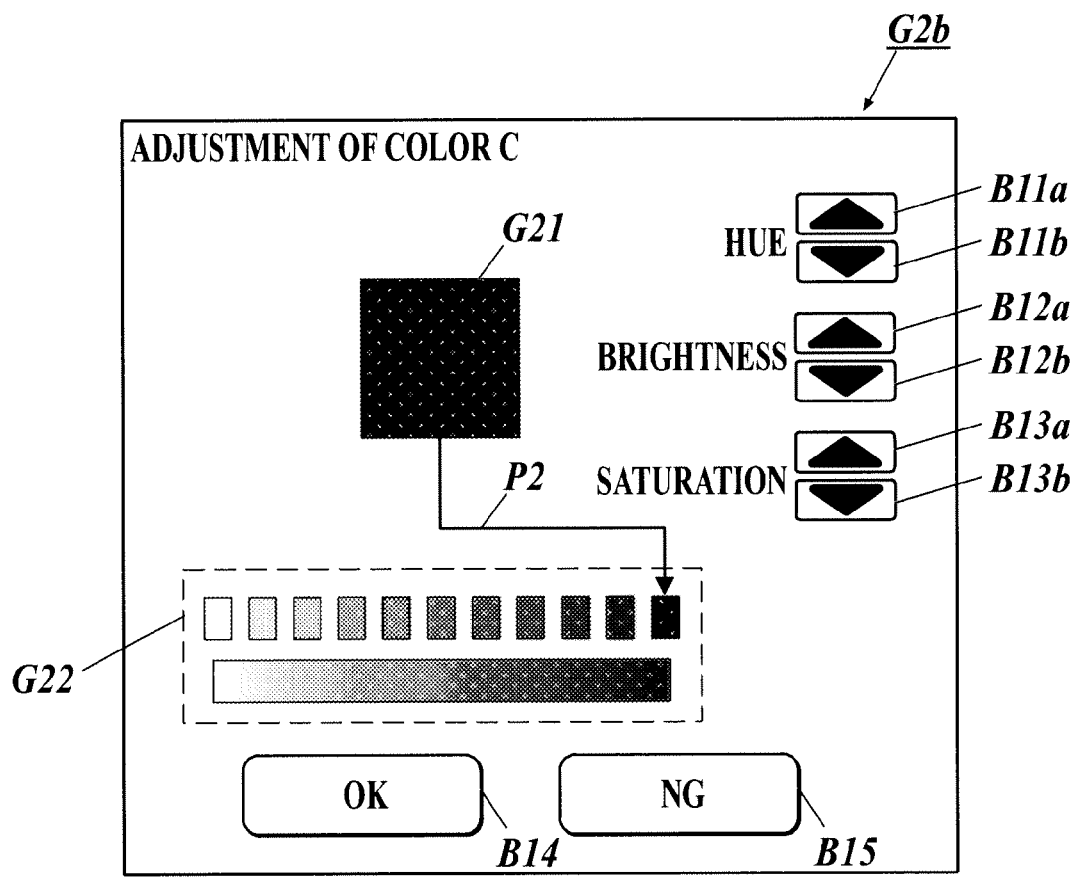
FIG. 6 is a diagram showing an example of a color adjustment screen.

FIG. 5 and FIG. 6 show examples of a color adjustment screen displayed in step S6.

The color adjustment screen G2a shown in FIG. 5 displays an example when the color set in step S5 is pure white. The color adjustment screen G2a shown in FIG. 5 is provided with a reference patch image G21 showing a color (pure white) set in step S5, hue adjustment buttons B11a and B11b, brightness adjustment buttons B12a and B12b, saturation adjustment buttons B13a and B13b, OK button B14, and the like.

The reference patch image G21 is an enlarged image of the display patch image shown by the pointer P1 of the preview screen G1.

The hue adjustment buttons B11a and B11b are buttons to receive an adjustment instruction of hue of the color which the reference patch image G21 represents. The brightness adjustment buttons B12a and B12b are buttons to receive an adjustment instruction of brightness of the color which the reference patch image G21 represents. The saturation adjustment buttons B13a and B13b are buttons to receive an adjustment instruction of saturation of the color which the reference patch image G21 represents.

Therefore, at least any one of the hue adjustment buttons B11a and B11b, the brightness adjustment buttons B12a and B12b, and the saturation adjustment buttons B13a and B13b are operated to receive the adjustment instruction and color adjustment information is input including adjustment information of at least any one of hue, brightness and saturation according to the adjustment instruction.

When the color set in step S5 is solid black, the color adjustment screen displayed is the same other than the reference patch image G21 being an enlarged image of the display patch image of the display color sample image corresponding to the basic color patch of the print color sample image of black.

FIG. 6 shows an example of a color adjustment screen G2b displayed in step S6 when the color set in step S5 is cyan (C). The color adjustment screen G2b shown in FIG. 6 is provided with a reference patch image G21 showing the color set in step S5 (cyan (C)), reference color adjustment image G22, reference pointer P2, hue adjustment buttons B11a and B11b, brightness adjustment buttons B12a and B12b, saturation adjustment buttons B13a and B13b, OK button B14, NG button B15 and the like.

The reference patch image G21 is an enlarged image of the display patch image which the pointer P1 of the preview screen G1 indicates. The reference color adjustment image G22 is a display color sample image of the color set in step S5. The reference pointer P2 indicates the display patch image displayed as the reference patch image G21 among the plurality of display patch images included in the display color sample image.

The hue adjustment buttons B11a and B11b, the brightness adjustment buttons B12a and B12b and the saturation adjustment buttons B13a and B13b shown in FIG. 6 are similar to the hue adjustment buttons B11a and B11b, the brightness adjustment buttons B12a and B12b and the saturation adjustment buttons B13a and B13b shown in FIG. 5, and therefore the description is omitted.

Embodiment 1 is described using an example which receives adjustment instruction of the hue, brightness and saturation by using various buttons, however the embodiment is not limited to the above. For example, a configuration is possible where the adjustment instruction of each of the hue, brightness and saturation can be received using a sliding button which can be changed continuously. Moreover, a configuration is possible where a plurality of candidates with different hue, brightness and saturation can be displayed, and a selection instruction of any one of the plurality of candidates is received, and the received candidates of the hue, brightness and saturation are obtained as the color adjustment information.

The user looks and compares the color of the patch image (basic color patch) on the adjustment chart corresponding to the display patch image which the pointer P1 of the preview screen G1 indicates and the color of the reference patch image G21 of the color adjustment screen. Then, the user presses the hue adjustment buttons B11a and B11b, the brightness adjustment buttons B12a and B12b and the saturation adjustment buttons B13a and B13b of the color adjustment screen to input color adjustment information so that the color of the reference patch image G21 and the color of the basic color patch on the adjustment chart match.

The control section 10 obtains the color adjustment information input through the input section 13b with operation of the color adjustment screen by the user and adjusts the RGB value which represents the color of the reference patch image G21 according to the color adjustment information (step S7).

In step S7, when the color according to the color adjustment information is at the limit of the color gamut reproducible by the display section 13a and cannot be adjusted, it is preferable to display a message notifying the above or to make the pressing of the various buttons necessary for input of color adjustment information invalid. The limit of the color gamut can be judged by the RGB value which represents the color of the reference patch image G21. For example, when at least any one of the value of the RGB value is 0 (minimum value) or 255 (maximum value), it is the maximum saturation when the hue and the brightness is fixed to the present value, therefore, it is not possible to raise the saturation any more and it can be said that it is the limit of the color gamut.

The control section 10 judges whether or not the NG button 315 is pressed (step S8).

When the NG button is not pressed and the OK button is pressed (step S8; NO), the control section 10 advances the processing to step S14. When the OK button is pressed, the control section 10 regards the color of the basic color patch set in step S5, in other words, the color of the print color sample image corresponding to the color of the display color sample image set in step S5 is within the color gamut reproducible by the display section 13*a*.

When the NG button is pressed (step S8; YES), the control section 10 regards the color of the basic color patch set in step S5, in other words, the color of the print color sample image corresponding to the color of the display color sample image set in step S5 is outside the color gamut reproducible by the display section 13*a*.

The control section 10 changes the color adjusted by the user on the color adjustment screen to a color of a display patch image with a tone lower than the display patch image set at present as the reference patch image (since the display patch image set at present as the reference patch image is a basic color patch with a tone of 100%, for example, a color of a display patch image with a tone of 90%), and performs the change of the patch image to be compared by sight on the adjustment chart by the user (step S9).

The control section 10 sets the color of the reference patch image G21 of the color adjustment screen to the color of the patch image changed in step S9, and the position of the patch image indicated by the reference pointer P2 is changed to the position of the reference patch image and displayed. Moreover, the control section 10 moves the position of the pointer P1 of the preview screen G1 to the position of the display patch image corresponding to the reference patch image changed in step S9 and displays the position.

The user looks and compares the color of the patch image on the adjustment chart corresponding to the display patch image indicated by the pointer P1 of the preview screen G1 and the color of the reference patch image G21 of the color adjustment screen. Then, the user presses the hue adjustment buttons B11*a* and B11*b*, the brightness adjustment buttons B12*a* and B12*b* and the saturation adjustment buttons B13*a* and B13*b* of the color adjustment screen to input color adjustment information so that the color of the reference patch image G21 matches the color of the patch image on the adjustment chart.

When the control section 10 obtains the color adjustment information input through the input section 13*b* with operation of the color adjustment screen by the user, the control section 10 adjusts the RGB value representing the color of the reference patch image G21 according to the color adjustment information (step S10).

In step S10, when the color according to the color adjustment information is at the limit of the color gamut reproducible by the display section 13*a* and cannot be adjusted, as described above, it is preferable to display a message notifying the above or to make the pressing of the various buttons necessary for input of color adjustment information invalid.

The control section 10 judges whether or not the NG button B15 is pressed (step S11).

When the NG button is pressed (step S11; YES), the control section 10 returns to the processing of step S9.

When the NG button is not pressed and the OK button is pressed (step S11; NO), the control section 10 displays the color gamut compression method adjustment screen on the display section 13*a* (step S12).

Figure 7:
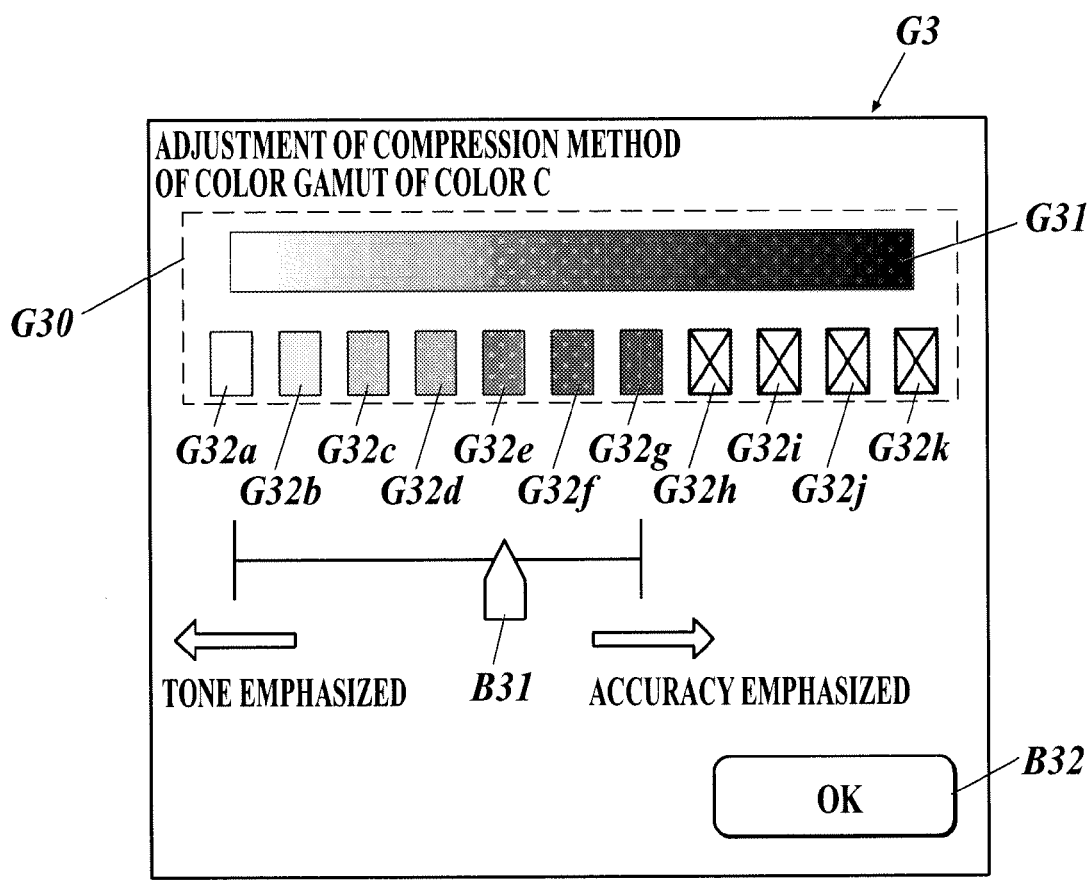
FIG. 7 is a diagram showing an example of a color gamut compression method adjustment screen.

FIG. 7 shows an example of the color gamut compression method adjustment screen.

The color gamut compression method adjustment screen G3 shown in FIG. 7 is an example of a color gamut compression method adjustment screen G3 displayed in step S12 when the OK button is pressed, in a case where the color set in step S5 is cyan (C), and the reference patch image of the color adjustment screen is a color with a tone value of 60%. As shown in FIG. 7, the color gamut compression method adjustment screen G3 is provided with a reference color gamut compression image G30, sliding button B31, OK button 332 and the like.

The reference color gamut compression image G30 is configured including a compression sample gradation image G31, and compression standard patch images G32*a* to 32*k*.

The compression sample gradation image G31 changes the tone continuously according to the compression method pointed by the sliding button 331.

Regarding the compression standard patch images G32*a* to G32*k*, the display patch image of the color of the tone value reproducible by the display section 13*a* is displayed among the display patch image of the display color sample image corresponding to the patch image of the adjustment chart. The display patch image of the color of the tone value reproducible by the display section 13*a* is the display patch image of the color with a tone value the same as or less than the tone value of the display patch image corresponding to the reference patch image G21 displayed on the color adjustment screen when the OK button is pressed in step S11.

The display patch image of the color of the tone value not reproducible by the display section 13*a* is not displayed (shown with an X "X" mark in FIG. 7).

The reference color gamut compression image G30 and sliding button B31 presents the compression method to compress the display color sample image corresponding to the print color sample image of the color set in step S5 within the color gamut reproducible by the display section 13*a*.

The sliding button B31 is operated by the user and receives the selection instruction of the compression method within the range of the tone displayed among the compression standard patch images G32*a* to G32*k*.

There is a tone emphasized compression method and an accuracy emphasized compression method as a compression method presented by the sliding button B31 in embodiment 1.

The tone emphasized compression method is a compression method which emphasizes the tone of the print color sample image and the method uses a color within the color gamut reproducible by the display section 13*a* to reproduce the tone of the print color sample image.

The accuracy emphasized compression method is a compression method which emphasizes accuracy (match) between the color of the print color sample image and the color of the color gamut reproducible by the display section 13*a* within the color gamut reproducible by the display section 13*a*. In the accuracy emphasized compression method, the color of the tone value of the display color sample image and the color of the tone value of the print color sample image are in a relation of direct proportion of 1 to 1 within the color gamut reproducible by the display section 13*a*.

The user specifies the tone range in which the tone emphasized compression method is applied and the tone range in which the accuracy emphasized compression method is applied, the tone value indicated by the sliding button B31 being the border, within the range of the tone values represented by the compression standard patch images G32*a* to G32*k*.

Figure 8:
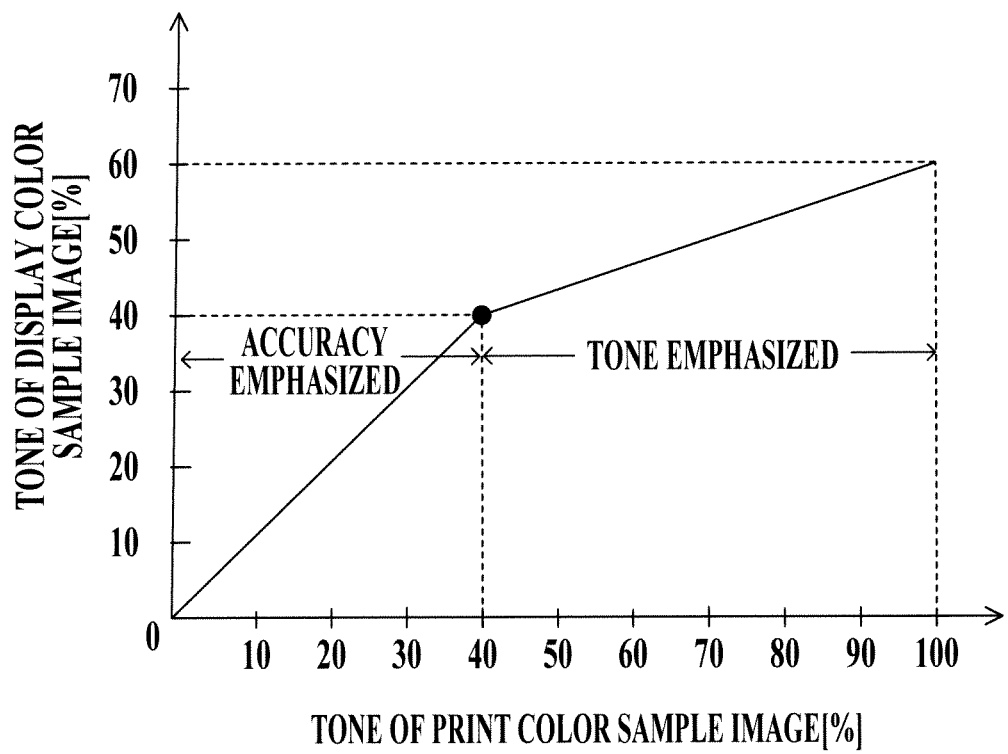
FIG. 8 is an image diagram of a compression method by a tone emphasized compression method and a compression method by an accuracy emphasized compression method.

FIG. 8 is an image diagram showing the compression method by the tone emphasized compression method and the compression method of the accuracy emphasized compression method according to the tone value indicated by the sliding button B31. FIG. 8 is an example in which the tone value reproducible by the display section 13a is 0 to 60%, and the sliding button B31 indicates a tone value of 40%. As shown in FIG. 8, the compression method of the display color sample image changes at the tone value of 40% being the border.

For example, when the tone value of 0 to 40% of the print color sample image is displayed on the display section 13a, the accuracy emphasized compression method is used so that the tone value of the display color sample image is represented by a tone value similar to the tone value of the print color sample image. On the other hand, when the tone value of 40 to 100% of the print color sample image is displayed on the display section 13a, the tone emphasized compression method is used and the tone of 40 to 100% of the print color sample image is represented by the tone of 40 to 60% of the display color sample image.

Figure 9A:
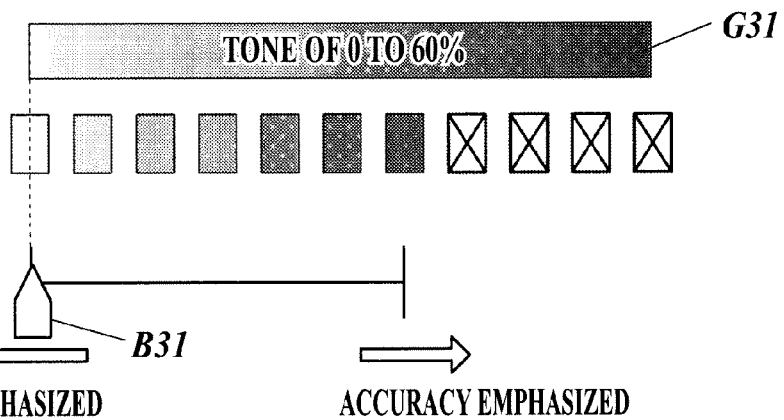
FIG. 9A is a diagram showing an example of a portion of a color gamut compression method adjustment screen when a tone pointed by a sliding button is 0%.
Figure 9B:
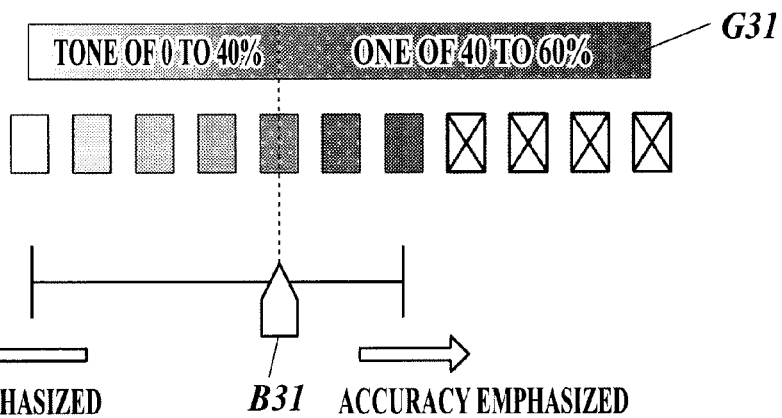
FIG. 9B is a diagram showing an example of a portion of a color gamut compression method adjustment screen when a tone pointed by a sliding button is 40%.
Figure 9C:
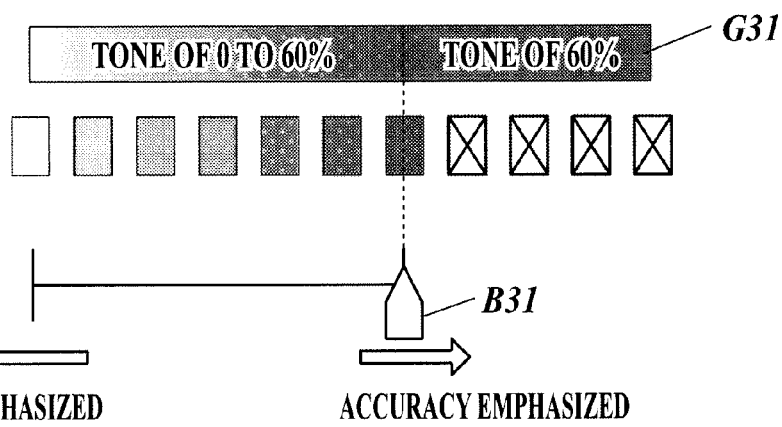
FIG. 9C is a diagram showing an example of a portion of a color gamut compression method adjustment screen when a tone pointed by a sliding button is 60%.

FIG. 9A to FIG. 9C shows an example of one portion of color gamut compression method adjustment screen according to the tone value pointed by the sliding button B31. FIG. 9A to FIG. 9C is an example when the tone value reproducible by the display section 13a is 0 to 60%.

FIG. 9A shows an example when the tone value indicated by the sliding button B31 is 0%.

As shown in FIG. 9A, in compression sample gradation image G31, when the tone value indicated by the sliding button B31 is 0%, the tone of the print color sample image is reproduced using the tone reproducible by the display section 13a. For example, the compression sample gradation image G31 showing the tone of 0 to 100% of the print color sample image is represented by the tone of 0 to 60% of the display color sample image.

FIG. 9B shows an example when the tone value indicated by the sliding button 331 is 40%. As shown in FIG. 9B, in the compression sample gradation image G31, since the compression method differs at the tone value 40% being the border, the tone change is different.

For example, the portion showing the tone of 0 to 40% of the print color sample image of the compression sample gradation image G31 is represented by the tone of 0 to 40% of the display color sample image, and the portion showing the tone of 40 to 100% of the print color sample image of the compression sample gradation image G31 is represented by the tone of 40 to 60% of the display color sample image.

FIG. 9C shows an example when the tone value indicated by the sliding button B31 is 60%, in other words, the maximum tone value reproducible by the display section 13a.

As shown in FIG. 9C, in the compression sample gradation image G31, when the tone value indicated by the sliding button 331 is the maximum tone value reproducible by the display section 13a, the tone of the print color sample image is reproduced so that the color of the tone value of the display color sample image and the color of the tone value of the print color sample image are in a relation of direct proportion of 1 to 1 within the color gamut reproducible by the display section 13a.

For example, the portion of the compression sample gradation image G31 showing the tone of 0 to 60% of the print color sample image is represented by the tone of 0 to 60% of the display color sample image, and the portion of the compression sample gradation image G31 showing the tone of 60 to 100% of the print color sample image is represented by the tone of 60% of the display color sample image.

The user looks and compares the gradation image of the patch image on the adjustment chart corresponding to the display patch image indicated by the pointer P1 of the preview screen G1 and the compression sample gradation image shown by the color gamut compression method adjustment screen G3 and operates the sliding button 331 to perform selection instruction of the compression method.

In the color gamut compression method adjustment screen G3, when the OK button 332 is pressed, the control section 10 obtains the selection instruction of the compression method based on the tone value indicated by the sliding button 331 set when the OK button B32 is pressed (step S13).

After step S13, or after step S8; NO, the control section 10 judges whether or not there is a color of the display color sample image which is not adjusted among the plurality of display color sample images corresponding to the plurality of print color sample images formed on the adjustment chart (step S14). When there is a color of the display color sample image which is not adjusted (step S14; YES), the control section 10 advances the processing to step S5.

When there is no color of the display color sample image which is not adjusted (step S14; NO), the control section 10 generates correction data to correct the monitor profile (step S15), stores the correction data in the nonvolatile memory 11 and ends the display color adjustment processing.

An example of the processing of generating correction data performed in step S15 is described.

The control section 10 calculates the difference value between the color data value (RGB value) of the color space depending on the display device generated in step S3 and the RGB value of the color of the reference patch image adjusted according to the color adjustment information obtained when the OK button is pressed on the color adjustment screen with respect to each color of the basic color patch of the plurality of print color sample images formed on the adjustment chart.

Moreover, when the control section 10 obtains the selection instruction of the compression method, the control section 10 adjusts the color data value (RGB value) of the color space depending on the display device of each patch image of the print color sample image based on the color data value (RGB value) of the color space depending on the display device generated in step S3 of each patch image of the print color sample image, and the RGB value of the color of the reference patch image adjusted according to the compression method and the color adjustment information obtained when the OK button is pressed on the color adjustment screen with respect to each color of the plurality of print color sample images formed on the adjustment chart. Then, the control section 10 calculates the difference value between the color data value (RGB value) of the color space depending on the display device generated in step S3 and the adjusted color data value (RGB value) of the color space depending on the display device of each patch image of the print color sample image for each color of the plurality of print color sample images formed in the adjustment chart.

The control section 10 stores the difference value of each patch image calculated with respect to each color of the plurality of print color sample images formed in the adjustment chart as correction data in the nonvolatile memory 11.

It is preferable that the difference value of the tone value between each patch image is calculated using linear interpolation, etc. Moreover, it is preferable that correction data for each color represented between each color is obtained by calculating the difference value of each tone value of the color by linear interpolation of the difference value of each tone value in between each color. However this does not apply to the processing of generating correction data.

Figure 10:
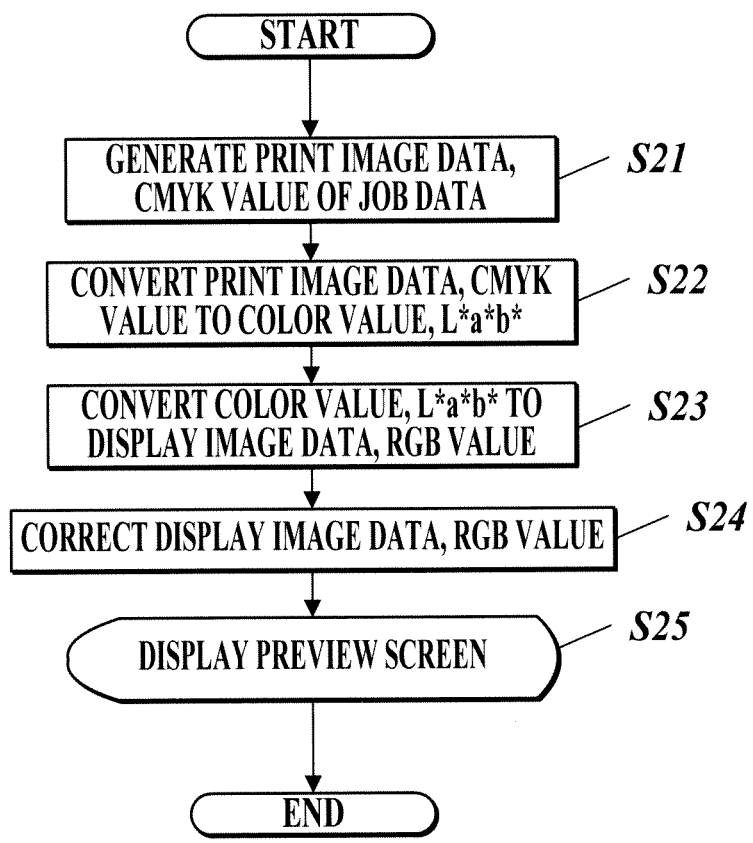
FIG. 10 is a flowchart showing a preview processing of embodiment 1.

FIG. 10 is a flowchart showing the preview processing of embodiment 1.

The control section 10 realizes the preview processing of embodiment 1 by performing the preview processing program.

The control section 10 performs various image processing on the job data of the print job such as calibration, etc. Then, the job data on which various image processing is performed is converted to print image data of the color data value (CMYK value) of the color space depending on the print device based on the printer profile and generates the data (step S21).

The control section 10 converts the print image data of the CMYK value converted to the color gamut reproducible by the print apparatus 2 in step S21 to the data of the color value (step S22). Further, the control section 10 converts the data of the color value (L*a*b*) generated in step S22 to display image data of the color data value (RGB value) of the color space depending on the display device based on the monitor profile (step S23).

The control section 10 reads out the correction data stored in the nonvolatile memory 11 and performs correction of the color data value of the display image data based on the correction data (step S24).

In step S24, the data in which the color gamut is compressed based on the monitor profile is further compressed and adjusted based on the correction data.

The control section 10 displays the preview screen on the display section 13a displaying the preview screen of the print job based on the display image data corrected in step S24 (step S25) and the preview processing ends.

It is preferable that the preview screen of the adjustment chart corrected based on the correction data is displayed with the preview screen of the print job displayed on the display section 13a in step S25. By displaying the preview screen of the adjustment chart, the user can easily understand how the color on the preview screen of the print job is actually output from the print apparatus 2 by looking and comparing the preview screen of the adjustment chart with the adjustment chart.

As described above, according to the embodiment 1, by performing the display color adjustment processing, the user can subjectively make the color of the image displayed on the preview display closer to the color of the image formed on the paper and the accuracy of prior confirmation of the image formed on the paper by preview display can be enhanced.

Specifically, the color data value of the color space depending on the display device showing the color of the presented display patch image can be adjusted based on the color adjustment information input by the user based on the color of the display patch image of the display color sample image displayed in the reference patch image of the color adjustment screen presented to the user, and the color of the patch image of the print color sample image of the adjustment chart corresponding to the presented reference patch image. Therefore, the color of the image displayed in the preview display can be adjusted to the color of the image formed on the paper according to the desire of the user.

In embodiment 1, the user can adjust the color data value showing the color of the display color sample image based on the color adjustment information including adjustment information of at least any one of hue, brightness or saturation of the color of the display color sample image input on the color adjustment screen by the user.

Moreover, when the color of the basic color patch of the print color sample image is a color outside of the color gamut reproducible by the display section (step S8; YES), by displaying the color gamut compression method adjustment screen, a plurality of types of compression methods to compress the display color sample image corresponding to the print color sample image within the color gamut reproducible by the display section can be presented to the user. Then, the compression method selected with operation of the sliding button by the user is applied and the color data value representing the color of the display color sample image can be adjusted. Therefore, even when the color data value of the color space depending on the print device is outside the color space depending on the display device, the compression method according to the desire of the user is applied and the color of the image displayed on the preview image can be adjusted.

As the compression method selected by the user, the tone emphasized compression method and the accuracy emphasized compression method can be employed to adjust the color data value representing the color of the display color sample image.

Moreover, as the adjustment chart, a chart formed with a plurality of print color sample images including a bar shaped image in which the tone continuously changes and a patch image indicating a color of a plurality of tone values of the bar shaped image can be used. Therefore, the user can easily confirm the change of the tone of each color by sight.

Embodiment 2

Below, embodiment 2 of the present invention is described in detail with reference to the drawings.

First, the configuration is described.

Figure 11:
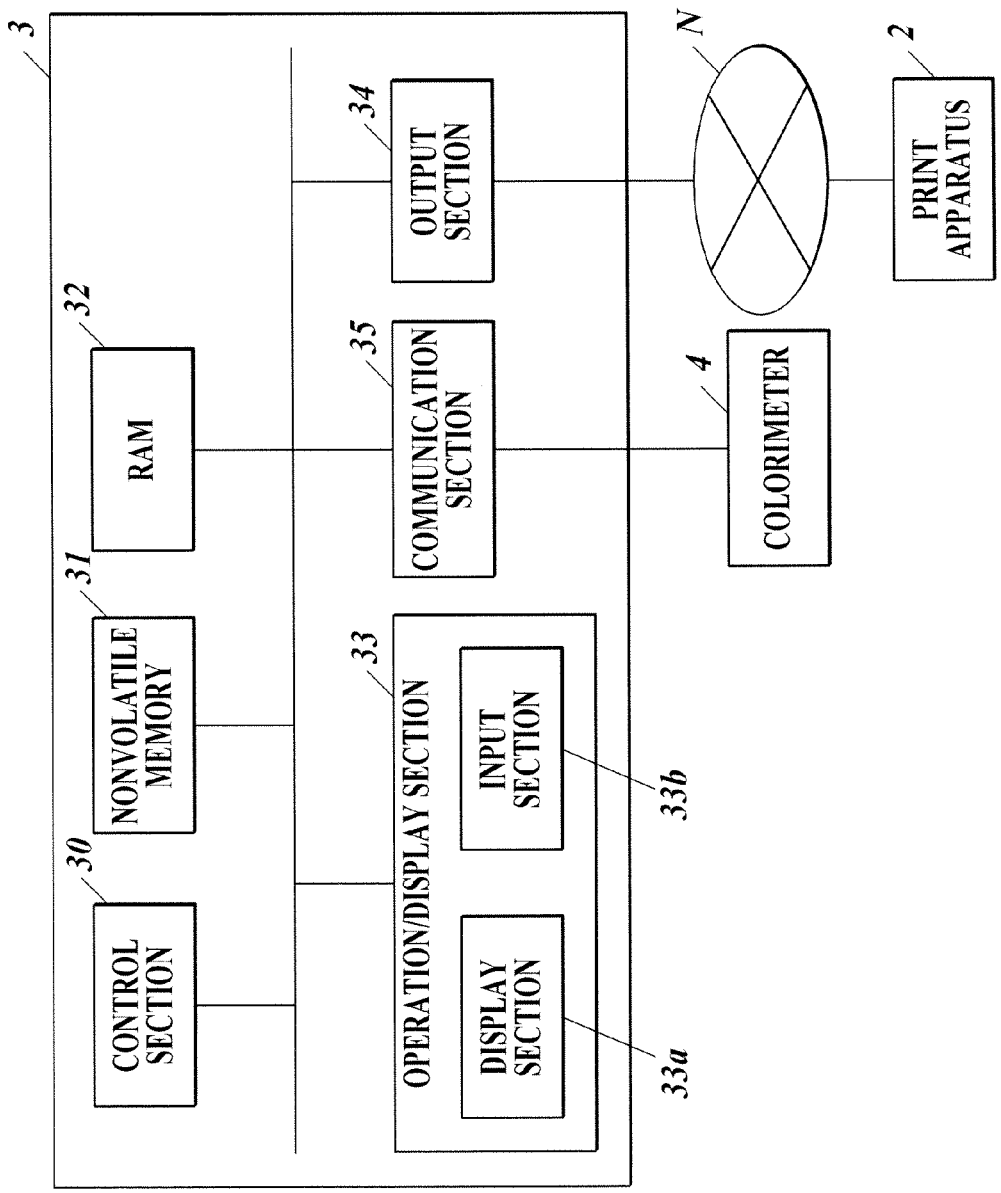
FIG. 11 is a functional configuration diagram showing a print preview apparatus of embodiment 2.

FIG. 11 is a functional configuration diagram showing a print preview apparatus 3 of embodiment 2.

As shown in FIG. 11, the print preview apparatus 3 includes a control section 30, a nonvolatile memory 31, a RAM 32, an operation/display section 33, an output section 34, a communication section 35, and the like, and each section is connected electrically and controlled by the control section 30.

As the print preview apparatus 3 of embodiment 2, a typical PC (Personal Computer) including a printer controller function and connected to a print apparatus 2 through a communication network N can be used. The print apparatus 2 is similar to the print apparatus 2 of embodiment 1, and therefore the description is omitted.

The control section 30 is composed of a CPU, etc. The control section 30 reads out a program specified from a system program and various application programs stored in the nonvolatile memory 31, expands the program in the RAM 32 and in coordination with the program expanded in the RAM 32, various processing is performed. The control section 30 centrally controls each section of the print preview apparatus 3.

Further, the control section 30 reads out a display color adjustment processing program, a preview processing program and various pieces of data of embodiment 2 from the nonvolatile memory 31 and expands the program and the pieces of data in the RAM 32. Then, in coordination with the program and the pieces of data, the control section 30 performs the display color adjustment processing and the preview processing.

The preview processing is similar to the preview processing of embodiment 1, and therefore the illustration and description is omitted.

In the display color adjustment processing, first, similar to embodiment 1, the adjustment chart on which a plurality of print color sample images are formed is output from the print apparatus 2.

Moreover, a preview screen is displayed on a display section 33a of an operation/display section 33 and the preview screen displays a plurality of display color sample images (preview image of adjustment chart) corresponding to each of the plurality of print color sample image.

The adjustment chart is similar to that of embodiment 1, and therefore the illustration and description is omitted.

Next, in the display color adjustment processing of embodiment 2, a color measurement screen is displayed on the display section 33a and the color measurement screen successively presents each of the plurality of display color sample images on the preview screen. Then, the color value of the color of the presented display color sample image and the color value of the color of the print color sample image corresponding to the presented display color sample image is input by the user using the colorimeter and the input color value is obtained as the color adjustment information. The color data value (RGB value) showing the color of the presented display color sample image is adjusted based on the obtained color adjustment information.

Moreover, in the display color adjustment processing, when the color of the print color sample image corresponding to the presented display color sample image is a color outside the color gamut which can be reproduced by the display section 33a, a color gamut compression method adjustment screen is displayed on the display section 33a and the color gamut compression method adjustment screen presents various types of compression methods to compress the display color sample image corresponding to the print color sample image within a color gamut which can be reproduced by the display section 33a to the user. The compression method selected by the user on the color gamut compression method adjustment screen is applied to generate correction data to adjust the color data value showing the color of the display color sample image and the correction data is stored in the nonvolatile memory 31.

In addition to a system program, various application programs and various pieces of data, the nonvolatile memory 31 stores a display color adjustment processing program and preview processing program of embodiment 2, various pieces of data necessary to perform such programs, pieces of data processed by the various programs, and the like.

The RAM 32, the operation/display section 33 and the output section 34 are the same as the RAM 12, operation/display section 13 and output section 14 of embodiment 1, and therefore the description is omitted.

The communication section 35 includes a driver of various external devices such as a USB driver, etc. and performs, control, etc. of data communication with the external device through a communication line such as a USB cable, etc. Moreover, the communication section 35 of embodiment 2 is connected to a colorimeter 4 and performs control of data communication with the colorimeter 4.

The colorimeter 4 measures the color of the patch image of the plurality of print color sample images formed on the adjustment chart output from the print apparatus 2. The colorimeter 4 also measures the color of the enlarged image (reference patch image) of the display patch image of the display color sample image displayed on the display section 33a. Then, the colorimeter 4 generates the colorimetric data of each measurement. The colorimetric data is data of the color value represented in a color system which does not depend on a device such as $L^*a^*b^*$, XYZ, etc.

Next, the operation of the embodiment 2 is described.

Figure 12:
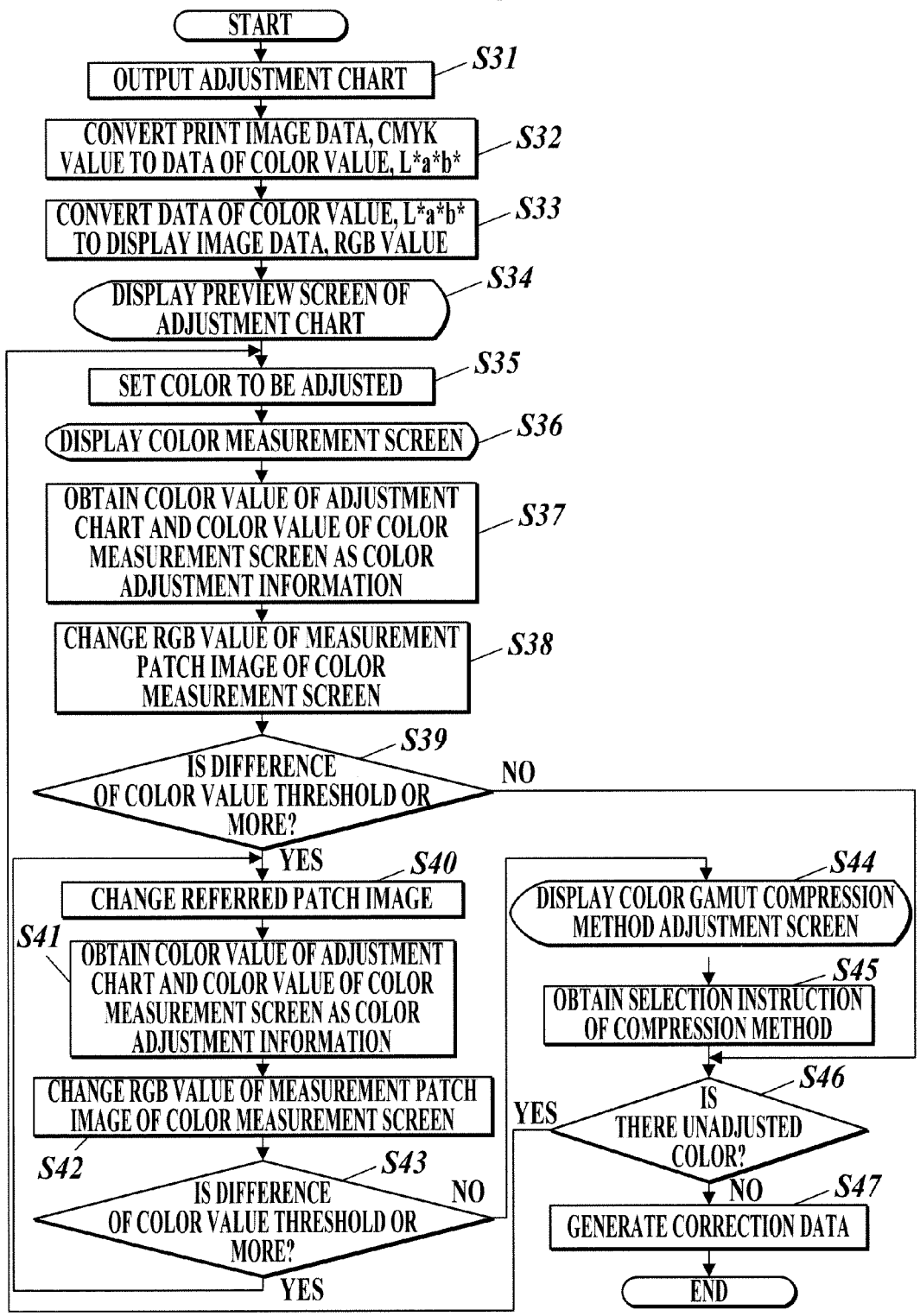
FIG. 12 is a flowchart of a display color adjustment processing of embodiment 2.

FIG. 12 shows a flowchart of the display color adjustment processing in embodiment 2.

The control section 30 performs the display color adjustment processing program to realize the display color adjustment processing of embodiment 2.

The processing of steps S31 to S35 is similar to the processing of steps S1 to S5 shown in FIG. 3 of embodiment 1, therefore the description is omitted.

The control section 30 displays the color measurement screen of the color set in step S35 on the display section 13a (step S36).

The color measurement screen is provided with a measurement patch image, message, etc.

The measurement patch image is an enlarged image of the display patch image of the display color sample image indicated by the pointer P1 on the preview screen G1 of the color set in step S35.

The message notifies the user of the instruction to measure with the colorimeter the measurement patch image and the patch image of the adjustment chart corresponding to the display patch image of the display color sample image indicated by the pointer P1 on the preview screen G1.

The user uses the colorimeter to perform measurement of the color value of the patch image (basic color patch) on the adjustment chart corresponding to the display patch image (basic color patch) indicated by the pointer P1 of the preview screen G1. Moreover, the operator uses the colorimeter to perform the measurement of the color value of the measurement patch image of the color measurement screen.

Since the measurement patch image of the color measurement screen is an enlarged image of the display patch image of the display color sample image indicated by the pointer P1 of the preview screen G1, to measure the color value of the measurement patch image of the color measurement screen means to measure the color value of the display patch image of the display color sample image indicated by the pointer P1 of the preview screen G1.

The control section 30 obtains the color value of the patch image of the adjustment chart and the color value of the measurement patch image of the color measurement screen as color adjustment information input through the communication section 35 by the operation of the colorimeter by the user (step S37).

The control section 30 adjusts the RGB value of the measurement patch image of the color measurement screen so that the difference between the obtained color value of the measurement patch image of the color measurement screen and the obtained color value of the patch image of the adjustment chart becomes small (step S38).

The control section 30 judges whether or not the difference between the color value of the patch image of the adjustment chart and the color value of the measurement patch image of the color measurement screen adjusted in step S38 is a threshold value (for example, $\Delta E=5$) or more (step S39).

When the difference of the color value is less than the threshold value (step S39; NO), the control section 30 advances the processing to step S46. When step S39; NO, the control section 30 considers the color of the basic color patch set in step S35, in other words, the color of the print color sample image corresponding to the color of the display color sample image set in step S35 to be within the color gamut reproducible by the display section 33a.

When the difference of the color value is a threshold value or more (step S39; YES), the control section 30 considers the color of the basic color patch set in step S35, in other words, the color of the print color sample image corresponding to the color of the display color sample image set in step S35 to be outside the color gamut reproducible by the display section 33a.

The control section 30 changes the color measured by the user on the color measurement screen to a color of a display patch image with a tone lower than the display patch image set at present as the measurement patch image (since the display patch image set at present as the measurement patch image is a basic color patch with a tone of 100%, for example, a color of a display patch image with a tone of 90%), and performs the change of the patch image of which the color value is measured by the user (step S40).

The control section 30 sets the color of the measurement patch image of the color measurement screen to the color of the display patch image changed in step S40. Moreover, the control section 30 moves the position of the pointer P1 of the preview screen G1 to the position corresponding to the display patch image changed in step S40 and displays the position.

The user uses the colorimeter to perform the measurement of the color value of the patch image on the adjustment chart corresponding to the display patch image indicated by the pointer P1 of the preview screen G1. Moreover, the user performs measurement of the color value of the measurement patch image on the color measurement screen.

The control section 30 obtains the color value of the patch image of the adjustment chart input through the communication section 35 by the operation of the colorimeter by the user and the color value of the measurement patch image of the color measurement screen as the color adjustment information (step S41).

The control section 30 adjusts the RGB value of the measurement patch image of the color measurement screen so that the difference between the obtained color value of the measurement patch image of the color measurement screen and the obtained color value of the patch image of the adjustment chart is small (step S42).

The control section 30 determines whether or not the difference between the color value of the patch image of the adjustment chart and the color value of the measurement patch image of the color measurement screen adjusted in step S42 is a threshold value (for example, ΔE=5) or larger (step S43).

When the difference of the color value is a threshold value or larger (step S43; YES), the control section 30 returns the processing to step S40. When the difference of the color value is less than the threshold value (step S43; NO), the control section 30 displays the color gamut compression method adjustment screen on the display section 33a (step S44).

The processing of steps S44 to S47 is processing similar to steps S12 to S15 shown in FIG. 3 of embodiment 1, therefore, the description is omitted.

As described above, according to embodiment 2, with the display color adjustment processing, the color of the image displayed on the preview display can be made closer to the color of the image formed on the paper according to the measured color value and the accuracy of prior confirmation of the image formed on the paper by preview display can be enhanced.

Specifically, the color value of the display patch image of the display color sample image displayed on the reference patch image of the color measurement screen presented to the operator and the color value of the patch image of the print color sample image of the adjustment chart corresponding to the presented reference patch image are input from the colorimeter operated by the user, and the color data value of the color space depending on the display device representing the color of the presented display patch image can be adjusted based on each input color value (color adjustment information). Therefore, the color of the image displayed on the preview display can be adjusted to the color of the image formed on the paper according to the desire of the user.

Moreover, when the color of the basic color patch of the print color sample image is a color outside of the color gamut reproducible by the display section (step S39; YES), similar to embodiment 1, by displaying the color gamut compression method adjustment screen, a plurality of types of compression methods to compress the display color sample image corresponding to the print color sample image within the color gamut reproducible by the display section can be presented to the user. Then, the compression method selected with operation of the sliding button by the user is applied and the color data value representing the color of the display color sample image can be adjusted. Therefore, even when the color data value of the color space depending on the print device is outside the color space depending on the display device, the compression method according to the desire of the user is applied and the color of the image displayed on the preview display can be adjusted.

As the compression method selected by the user, the tone emphasized compression method and the accuracy emphasized compression method can be employed to adjust the color data value representing the color of the display color sample image.

Moreover, as the adjustment chart, a chart formed with a plurality of print color sample images including a bar shaped image in which the tone continuously changes and a patch image indicating a color of a plurality of tone values of the bar shaped image can be used. Therefore, the user can easily confirm the change of the tone of each color by sight.

In the embodiments 1 and 2, a configuration where a print preview apparatus 1 or 3 including a printer controller function and a print apparatus 2 are connected through a communication network N is described, however, the configuration is not limited to the above. For example, the invention can be applied to a combined apparatus including a print preview apparatus 1 or 3 and a print apparatus 2.

The above description discloses an example where a nonvolatile memory 11 or 31 is used as a computer readable medium including the program of the present invention, however, the example is not limited to the above.

As other computer readable media, a nonvolatile memory such as a flash memory, etc., a portable recording medium such as a CD-ROM can be used.

Moreover, as a medium to provide data of the program regarding the present invention through a communication line, a carrier wave can be employed in the present invention.

The present invention is not limited to the contents of the above embodiment 1 and 2 and can be appropriately modified without leaving the scope of the invention.

According to an aspect of the preferred embodiments of the present invention, there is provided a print preview apparatus including:

an output control section which outputs to a print apparatus an adjustment chart with a plurality of print color sample images formed based on a color data value of a color space depending on a print device adjusted to a color gamut reproducible by the print apparatus;

a conversion section which converts each color data value of the color space depending on the print device indicating a color of the plurality of print color sample images to a color data value of a color space depending on a display device;

a display section which displays a plurality of display color sample images corresponding to each of the plurality of print color sample images based on the color data value of the color space depending on the display device converted by the conversion section; and an adjustment section which successively presents to a user the plurality of display color sample images displayed on the display section and which adjusts a color data value indicating a color of the presented display color sample image based on color adjustment information input by the user based on the color of the presented display color sample image and the color of the print color sample image corresponding to the presented display color sample image.

Preferably, in the print preview apparatus, when the color of the print color sample image corresponding to the presented display color sample image is a color outside the color gamut reproducible by the display section, regarding each of the display color sample image presented to the user, the adjustment section presents a plurality of types of compression methods to compress the display color sample image corresponding to the print color sample image within a color gamut reproducible by the display section to the user and the adjustment section adjusts the color data value indicating the color of the display color sample image by applying the compression method selected by the user.

Preferably, in the print preview apparatus, the compression method presented to the user is a compression method which uses a color within the color gamut reproducible by the display section and emphasizes tone of the print color sample image or is a compression method which emphasizes accuracy between the color of the print color sample image and the color of the color gamut reproducible by the display section.

Preferably, in the print preview apparatus, the color adjustment information includes adjustment information of at least any one of hue, brightness or saturation of the color of the display color sample image.

Preferably, in the print preview apparatus, the color adjustment information includes a color value of the color of the display color sample image and a color value of the color of the print color sample image corresponding to the display color sample image.

Preferably, in the print preview apparatus, the print color sample image includes a bar shaped image in which the tone continuously changes and a patch image which indicates a color of the plurality of tones of the bar shaped image.

According to another aspect of the preferred embodiments of the present invention, there is provided a recording medium recording a program to allow a computer to function as:

an output control section which outputs to a print apparatus an adjustment chart with a plurality of print color sample images formed based on a color data value of a color space depending on a print device adjusted to a color gamut reproducible by the print apparatus;

a conversion section which converts each color data value of the color space depending on the print device indicating a color of the plurality of print color sample images to a color data value of a color space depending on a display device;

a display section which displays a plurality of display color sample images corresponding to each of the plurality of print color sample images based on the color data value of the color space depending on the display device converted by the conversion section; and an adjustment section which successively presents to a user the plurality of display color sample images displayed on the display section and which adjusts a color data value indicating a color of the presented display color sample image based on color adjustment information input by the user based on the color of the presented display color sample image and the color of the print color sample image corresponding to the presented display color sample image.

Preferably, in the recording medium, when the color of the print color sample image corresponding to the presented display color sample image is a color outside the color gamut reproducible by the display section, regarding each of the display color sample image presented to the user, the adjustment section presents a plurality of types of compression methods to compress the display color sample image corresponding to the print color sample image within a color gamut reproducible by the display section to the user and the adjustment section adjusts the color data value indicating the color of the display color sample image by applying the compression method selected by the user.

Preferably, in the recording medium, the compression method presented to the user is a compression method which uses a color within the color gamut reproducible by the display section and emphasizes tone of the print color sample image or is a compression method which emphasizes accuracy between the color of the print color sample image and the color of the color gamut reproducible by the display section.

Preferably, in the recording medium, the color adjustment information includes adjustment information of at least any one of hue, brightness or saturation of the color of the display color sample image.

Preferably, in the recording medium, the color adjustment information includes a color value of the color of the display color sample image and a color value of the color of the print color sample image corresponding to the display color sample image.

Preferably, in the recording medium, the print color sample image includes a bar shaped image in which the tone continuously changes and a patch image which indicates a color of the plurality of tones of the bar shaped image.

Although various exemplary embodiments have been shown and described, the invention is not limited to the embodiments shown. Therefore, the scope of the invention is intended to be limited solely by the scope of the claims that follow and not by the above explanation, and it is intended that the present invention covers modifications and variations that come within the scope of the appended claims and their equivalents.

The present application is based on Japanese Patent Application No. 2010-139082 filed on Jun. 18, 2010 to the Japanese Patent Office, which shall be a basis for correcting mistranslations.

What is claimed is:

1. A print preview apparatus comprising:

an output control section which outputs to a print apparatus an adjustment chart with a plurality of print color sample images formed based on a color data value of a color space depending on a print device adjusted to a color gamut reproducible by the print apparatus;

a conversion section which converts each color data value of the color space depending on the print device indicating a color of the plurality of print color sample images to a color data value of a color space depending on a display device;

a display section which displays a plurality of display color sample images corresponding to each of the plurality of print color sample images based on the color data value of the color space depending on the display device converted by the conversion section; and an adjustment section which successively presents to a user the plurality of display color sample images displayed on the display section and which adjusts a color data value indicating a color of the presented display color sample image based on color adjustment information input by the user based on the color of the presented display color sample image and the color of the print color sample image corresponding to the presented display color sample image.

2. The print preview apparatus of claim 1, wherein when the color of the print color sample image corresponding to the presented display color sample image is a color outside the color gamut reproducible by the display section, regarding each of the display color sample image presented to the user, the adjustment section presents a plurality of types of compression methods to compress the display color sample image corresponding to the print color sample image within a color gamut reproducible by the display section to the user and the adjustment section adjusts the color data value indicating the color of the display color sample image by applying the compression method selected by the user.

3. The print preview apparatus of claim 2, wherein the compression method presented to the user is a compression method which uses a color within the color gamut reproducible by the display section and emphasizes tone of the print color sample image or is a compression method which emphasizes accuracy between the color of the print color sample image and the color of the color gamut reproducible by the display section.

4. The print preview apparatus of claim 1, wherein the color adjustment information includes adjustment information of at least any one of hue, brightness or saturation of the color of the display color sample image.

5. The print preview apparatus of claim 1, wherein the color adjustment information includes a color value of the color of the display color sample image and a color value of the color of the print color sample image corresponding to the display color sample image.

6. The print preview apparatus of claim 1, wherein the print color sample image includes a bar shaped image in which the tone continuously changes and a patch image which indicates a color of the plurality of tones of the bar shaped image.

7. A non-transitory recording medium recording a program to allow a computer to function as:
  an output control section which outputs to a print apparatus an adjustment chart with a plurality of print color sample images formed based on a color data value of a color space depending on a print device adjusted to a color gamut reproducible by the print apparatus;
  a conversion section which converts each color data value of the color space depending on the print device indicating a color of the plurality of print color sample images to a color data value of a color space depending on a display device;
  a display section which displays a plurality of display color sample images corresponding to each of the plurality of print color sample images based on the color data value of the color space depending on the display device converted by the conversion section; and
  an adjustment section which successively presents to a user the plurality of display color sample images displayed on the display section and which adjusts a color data value indicating a color of the presented display color sample image based on color adjustment information input by the user based on the color of the presented display color sample image and the color of the print color sample image corresponding to the presented display color sample image.

8. The non-transitory recording medium of claim 7, wherein when the color of the print color sample image corresponding to the presented display color sample image is a color outside the color gamut reproducible by the display section, regarding each of the display color sample image presented to the user, the adjustment section presents a plurality of types of compression methods to compress the display color sample image corresponding to the print color sample image within a color gamut reproducible by the display section to the user and the adjustment section adjusts the color data value indicating the color of the display color sample image by applying the compression method selected by the user.

9. The non-transitory recording medium of claim 8, wherein the compression method presented to the user is a compression method which uses a color within the color gamut reproducible by the display section and emphasizes tone of the print color sample image or is a compression method which emphasizes accuracy between the color of the print color sample image and the color of the color gamut reproducible by the display section.

10. The non-transitory recording medium of claim 7, wherein the color adjustment information includes adjustment information of at least any one of hue, brightness or saturation of the color of the display color sample image.

11. The non-transitory recording medium of claim 7, wherein the color adjustment information includes a color value of the color of the display color sample image and a color value of the color of the print color sample image corresponding to the display color sample image.

12. The non-transitory recording medium of claim 7, wherein the print color sample image includes a bar shaped image in which the tone continuously changes and a patch image which indicates a color of the plurality of tones of the bar shaped image.

* * * * *